United States Patent [19]
Beck

[11] 3,822,377
[45] July 2, 1974

[54] PARAMETER COMPENSATING CIRCUIT FOR FLOW METER

[75] Inventor: Edwin J. Beck, Bricktown, N.J.

[73] Assignee: H-B Industries Inc., Port Monmouth, N.J.

[22] Filed: June 22, 1973

[21] Appl. No.: 372,526

Related U.S. Application Data

[63] Continuation-in-part of Ser. No. 348,265, April 5, 1973.

[52] U.S. Cl...... 235/151.34, 73/194 EM, 73/194 M
[51] Int. Cl............................................. G01f 15/02
[58] Field of Search..... 73/194 EM, 231 M, 194 M, 73/233, 235; 235/151.34

[56] References Cited
UNITED STATES PATENTS

| | | | |
|---|---|---|---|
| 3,591,779 | 7/1971 | Sutherland, Jr............ | 235/151.34 X |
| 3,610,898 | 10/1971 | Yamamoto et al........... | 235/151.34 |
| 3,614,892 | 10/1971 | Ottenstein.................. | 235/151.34 X |
| 3,691,838 | 9/1972 | Kalotay..................... | 235/151.34 X |
| 3,699,320 | 10/1972 | Zimmerman et al.......... | 235/151.34 |
| 3,711,689 | 1/1973 | Park......................... | 235/151.34 |
| 3,729,995 | 5/1973 | Kovacs et al............... | 235/151.34 X |

Primary Examiner—Malcolm A. Morrison
Assistant Examiner—Edward J. Wise
Attorney, Agent, or Firm—Mel K. Silverman

[57] ABSTRACT

The present invention comprises a method of metering the volumetric flow of a fluid, wherein the fluid is represented by a pulse train having a frequency corresponding to the fluid's rate of flow. The present method serves to normalize the frequency to a predetermined reference parameter, thereby compensating for gravimetric changes occurring within the fluid. The basic steps of the present method include: dividing said pulse train into two subtrains; applying the output of one of said subtrains to an "N" stage binary divider; electronically comparing the corresponding parameter of said fluid to said predetermined reference parameter; generating an analog voltage that is proportional to the algebraic difference between said parameters; applying said analog voltage to an N stage analog-to-digital converter; applying the stage-by-stage output of said converter to each of the corresponding output stages of said binary divider; permitting a portion of the pulses of the output of said binary divider to pass to the other of said two pulse subtrains, such that the total of (i) the passed pulses and (ii) the pulses comprising said other subtrain, equals 100% of the number of pulses in the initial pulse train, said 100% occurring when said algebraic difference equals zero; and allowing additional pulses of said divider to be either passed or inhibited in a quantity directly proportional to the relative respective positive or negative polarity of said algebraic difference between said parameters, thereby obtaining a total pulse output having a frequency that is gravimetrically compensated to the predetermined reference parameter.

13 Claims, 2 Drawing Figures

PARAMETER COMPENSATING CIRCUIT FOR FLOW METER

PRIOR APPLICATION

This application is a Continuation-in-Part of Ser. No. 348,265, filed Apr. 5, 1973.

BACKGROUND OF THE INVENTION

The present invention relates to flow meters and, more particularly, to a system for measuring and compensating for the temperature of the material flowing through a flow meter.

Flow meters, which provide a digital reading of the rate of a fluid passing through a cross-sectional area, are well known in the art. However, conventional flow meters do not give an accurate indication of the mass of the material passing through them. This is particularly true when certain physical characteristics of the material, such as temperature, are variable. For this reason, systems have heretofore been developed to correct the flow measurement for changes in certain physical characteristics of the material passing through the flow meter.

Prior art systems have, for example, utilized mechanical elements for varying the flow signal from the flow meter in accordance with changes in one or more of the physical characteristics of the flow stream. However, these systems have often been found to have relatively slow responses to such changing characteristics of the fluid, and have often produced results having an unsatisfactory degree of error. Further, the elements of these prior systems are subject to various mechanical failures, thereby reducing their reliability.

Flow meter compensation systems have also been developed which attempt to provide reliable operation through the utilization of electronic circuitry. One such class of electronic circuitry provides for the periodic interruption of a series of electrical rate of flow pulses in accordance with changes in the magnitude of certain physical characteristics of the flow stream. This type of prior art system provides a series of groups of high frequency pulses, with substantial periods of time between said groups, during which time no signal is provided for compensating the flow meter. Systems of this type produce an irregular indication of the characteristics of the material passing through the flow meter, thereby resulting in the loss of valuable information.

Other approaches to the compensation problem include the use of relatively complex circuitry whose function is to either add or subtract pulses to a standard or reference pulse train, wherein the addition or subtraction of pulses reflect certain changes in the physical properties of the measured fluid. This approach, while theoretically ideal, presents both engineering and economic problems that derive from the undue complexity of the circuitry attendant in its application.

SUMMARY OF INVENTION

The present invention represents an attempt to overcome the various problems which have attended prior art efforts in the design of compensated flow meters. More particularly, a simplicity of design is attained through the imposition of certain practical assumptions. First among these assumptions is that all parameters of the fluid, except one, can be held within tolerances that will not require compensation therefor. Secondly, it is assumed that the one parameter that cannot be kept within an acceptable tolerance will nonetheless not deviate in excess of a predetermined percentage.

In certain industries, for example, the petroleum-chemical industry, the above two assumptions can be safely made. More particularly, in said industry, the only parameter whose variance presents a major problem, is that of temperature. Furthermore, due to the state of the art in delivery techniques, the variance or deviation of temperature or mass can be placed at a maximum of 10 percent. Because of the nature of the material being delivered, said temperature variance can occur in either a negative or positive direction.

Given the above factors, it becomes possible to design a temperature compensated circuit having a simplicity of design heretofore unattainable.

Accordingly, it is the general object of the present invention to provide a new and improved temperature compensation system particularly adapted for use with flow meters in the petro-chemical field.

Another object of the invention is to provide a system and a method of the above character in which pulses are added or subtracted up to a certain maximum percentage, from the flow signal pulse train in proportion to temperature deviations from a reference temperature.

DETAILED DESCRIPTION OF THE INVENTION

At present, petroleum liquids are generally measured volumetrically. As is known, fluid density varies inversely with temperature; therefore, any rise or fall in the temperature of a fluid will result in a decrease or increase in its density, accompanied by a proportional increase or decrease in its volume.

Due to the fact that petroleum products are piped through a wide variety of ambient temperature conditions, significant changes in density will occur. Such changes in density are often termed gravimetric changes. Gravimetric changes are exceedingly difficult to avoid in long pipelines in desert or arctic areas. Because of these changes, a pure volumetric measurement is not desirable in most applications. This is due to the fact that purchasers of petroleum and chemical fluids are concerned with the obtaining of a particular mass, or gravimetric quantity, of the given fluid. The particular volume which the fluid may occupy is generally of little economic significance, while the question of gravimetric quantity is of particular importance as regards the unit pricing of such liquids. For obvious reasons, it is not possible to quote unit prices in situations wherein the unit of measurement can often be a function of at least two variables, e.g., temperature and pressure. Accordingly, it is necessary to utilize a standard that will not be subject to change induced by conditions of the surrounding environment. The mass or gravimetric unit represents such a unit of measurement.

The general approach herein taken with regard to the problem is one of utilizing an otherwise standard flow (or volume) meter, having a digital count output, and then compensating said digital output in order to obtain a gravimetric measurement of the fluid. This end is achieved through the use of a novel compensating circuit which is hereinafter described.

Figure 1:
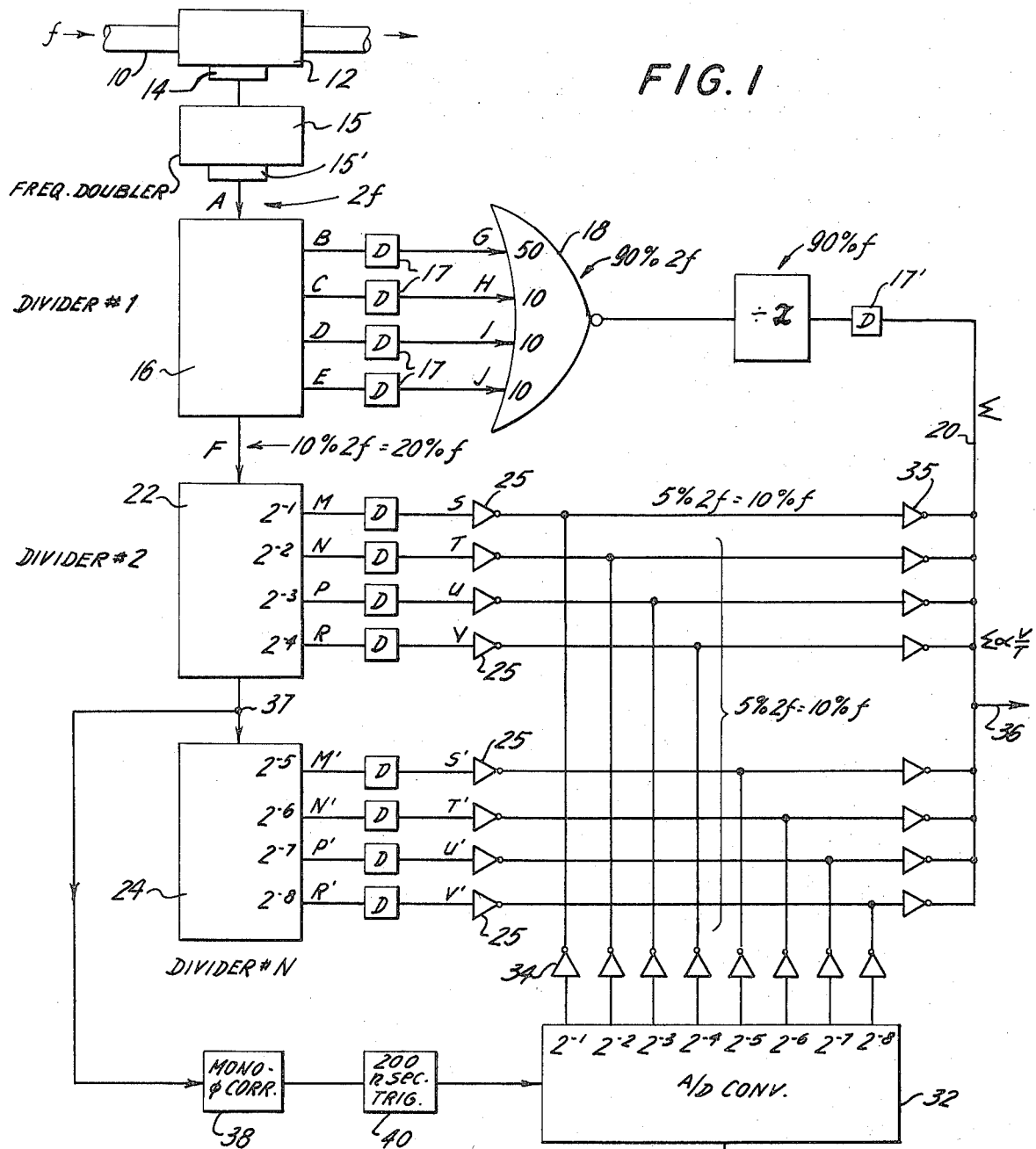
FIG. 1 is a circuit diagram of one embodiment of the invention in which the reading of the volumetric flow through the flow meter is compensated in accordance with changes in one physical characteristic of the flow stream up to a volumetric change of ±10%.
Figure 2:
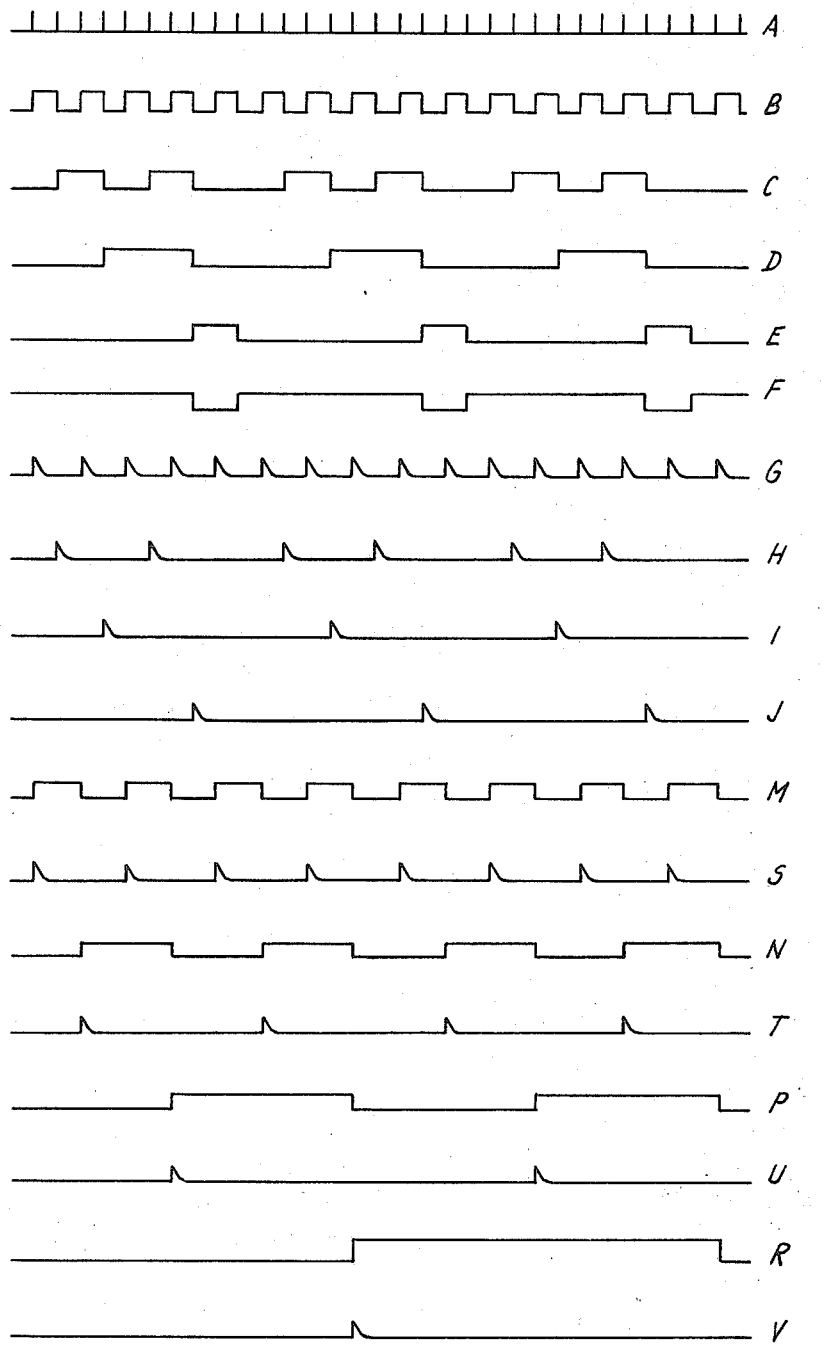
FIG. 2 represents a family of graphs illustrating voltage waveforms at various points in the circuit of FIG. 1.

Shown in FIG. 1 is a confined unidirectional fluid flow 10. Inserted into said fluid flow is a flow meter 12 which measures the flow rate of said fluid flow 10. The units of said flow measurement may be of any type standard to a particular trade or national locality, such as gallons (U.S. or imperial), barrels, etc. A pick-up coil 14 is affixed to the flow meter 12. The output of said coil comprises an AC voltage having a frequency f proportional to the flow rate of the fluid. Following said pick-up coil is a frequency doubler 15 and a wave shaper 15'. The purpose of these elements is to convert the sine wave output of 14 into a pulse train (see FIG. 2) having twice the input frequency at 14.

The pulse train A is then fed into a decade-divider 16, having outputs B, C, D, E and F. 10 percent of the A pulses are passed through the decade-divider 16 and into the output F. The remaining 90% of the pulses are divided between output B, which carries 50% of said A pulses, output C which carries 20% of the A pulses, and outputs D and E which each carry 10% of the remaining pulses.

Each of the pulse trains B, C, D, and E are fed into differentiators 17. The outputs of 17 are denoted as pulse trains G, H, I, and J respectively (see FIG. 2). Said differentiated pulse trains are fed into a summing gate 18, are then divided by 2, are differentiated again at 17', and are finally fed into a summing network 20. This output corresponds to 90% of the original flow meter frequency.

The signal F, containing 10% of the input pulses A (or 20% of the original frequency) is fed into two cascaded divide - by - 16 binary dividers 22 and 24. The outputs M through R of the individual binary dividers 22 and 24 are differentiated and then fed into a series of gates 25.

The resistance of a platinum temperature probe 26 is used with a constant current source 28 to create a voltage $V_2$ which will vary with the temperature changes of the fluid. This voltage is fed into a resistor $R_1$, thereby obtaining a current $I_2$. This current is fed into an operational amplifier 30, together with a current $I_1$. The current $I_1$ is adjusted in order to equal the current $I_2$ at the magnitude produced by the temperature probe circuit when the fluid is at its so called reference temperature $T_{ref}$. Said reference temperature generally corresponds to an industry established standard for a particular fluid or chemical. When such a fluid is at the reference temperature, $V_1$ will be equal to $V_2$; when the fluid temperature increases or decreases, $V_2$ will increase or decrease respectively, thereby producing a change in current $I_2$. Hence, $I_3$ will be proportional to $I_2 \pm I_1$.

The current summing operational amplifier 30 has a gain control $R_2$ which is varied in accordance with the temperature coefficient $C_T$ of the fluid being measured. It is to be noted that $V_0$ comprises a DC voltage which is proportional to the algebraic difference between the actual temperature T and the reference temperature $T_{ref}$ of the fluid.

The output voltage $V_0$ is fed into an analog-to-digital converter 32 having eight binary stages $2^{-1}$ through $2^{-8}$. The converter restarts at appropriate intervals, at periods which may roughly correspond to the flow time of one gallon of fluid through the meter 12. The "restart function" is regulated by tapping the divider 22 at point 37. This point corresponds to the $2^{-4}$ stage and, as such, will produce a restart of the converter 32 at a rate equal to $2^{-4}$ times the highest frequency of the pulse train 2f. Element 38 serves to shift the phase of the converter input by one-half of the highest input frequency at 37. This solves the problem of phase coincidence. Element 40 provides a 200 nanosecond pulse to the converter 32. This is considered to be an optimum width for use by the converter.

The output of each $2^{-n}$ stage is then applied to each of the corresponding stage-by-stage output gates of the binary dividers 22 and 24. Hence, the outputs S through V' will be inhibited in a manner that is directly proportional to the magnitude of the temperature difference $(T - T_{ref})$. More particularly, when the temperature deviation of the fluid is zero, there will be a "one-half scale state" analog-digital output, thus creating a "one state" output from the inverter $34_{-1}$ and creating "zero state" outputs from inverters $34_{-2}$ through $34_{-8}$. The "one state" output will allow one-half of the signals S through V' to pass, thereby permitting 5% (50% of pulse train F) of the input A (2f), therefore permitting 10% of the flow meter frequency f to pass directly into the summing network 20. Thus, a pulse output of 100% of the flow meter input is obtained. In such a 100% pulse output, no correction will appear on the flow meter 12 (because none is needed). However, as a temperature deviation occurs, the stages of converter 32 will progressively change in bit increments until all bits are zero (lowest temperature condition) or until all bits are one state (highest temperature condition).

Said bit outputs are inverted and applied to the outputs of the binary dividers in a sequence beginning with the pulse train S and, as the $V_0$ may dictate, continuing upward or downward in binary sequence. Thus, it is seen that as the temperature of the fluid 10 increases, an increasingly greater number of the pulses S through V' will be masked out or inhibited by the inverted outputs of the converter 32. Inversely, as the temperature decreases, a lesser number of pulses will be inhibited. At a condition of maximum negative deviation (−10%), output 36 will comprise 90% of the flow meter input f, thereby imposing the maximum (10%) negative gravimetric correction upon the volumetric reading of the flow meter 12. At the maximum positive deviation, output 36 will comprise 110% of the original flow meter frequency.

It is to be noted that elements 25, 34 and 35 comprise merely one suitable logic configuration for inhibiting pulse train S through V'. Accordingly, any of a number of combinations of logic elements could be used to obtain a similar inhibiting function.

It is to be further noted that the ±10% figure, on which the design of the present embodiment is based, merely represents an assumption as to maximum temperature deviation of the delivered fluid. While such an assumption will be valid over a wide range of systems, there may be others wherein the assumption of a greater (or lesser) deviation will be reasonable. In such event, the present system may simply be altered by changing the respective numbers of pulses coming out of various outputs, B, C, D, E and F of the decade divider 16.

It is to be noted that the present circuitry can be easily adapted in order to correct the reading on any type of digital flow meter whose accuracy might otherwise be adversely affected by a particular parameter of the environment in which it must operate. For example, the flow meter 12 could easily be replaced by a pressure differential meter, while the temperature probe 26 could similarly be replaced by a pressure responsive means.

While there is hereby shown and described the preferred embodiments of the invention, it will be understood that the invention may be embodied otherwise than as herein specifically illustrated or described, and that in the illustrated embodiments certain changes in the details of construction and in the form and arrangement of the parts may be made without departing from the underlying idea or principles of this invention within the scope of the appended claims.

Having thus described my invention, what is claimed as new, useful and non-obvious and, accordingly, is secured by Letters Patent of the United States, is:

1. A method of (1) metering the volumetric flow of a fluid, wherein the flow is represented by a pulse train having a frequency corresponding to the fluid flow rate, and of (2) normalizing said frequency to a predetermined reference parameter to compensate for gravimetric changes in said fluid, wherein the steps comprise:
   a. dividing said pulse train into two subtrains;
   b. applying the output of one of said subtrains to an "N" stage binary divider;
   c. electronically comparing the corresponding parameter of said fluid to said predetermined reference parameter;
   d. generating an analog voltage that is proportional to the algebraic difference between said parameters;
   e. applying said analog voltage to an N stage analog-to-digital converter;
   f. applying the stage-by-stage output of said converter to each of the corresponding output stages of said binary divider;
   g. permitting a portion of the pulses of the output of said binary divider to pass to the other of said two pulse subtrains, such that the total of (i) the passed pulses and (ii) the pulses comprising said other subtrain, equals 100% of the number of pulses in the initial pulse train, said 100% occurring when said algebraic difference equals zero; and
   h. allowing additonal pulses of said divider to be either passed or inhibited in a quantity directly proportional to the relative respective positive or negative polarity of said algebraic difference between said parameters,
   thereby obtaining a total pulse output having a frequency that is gravimetrically compensated to the predetermined reference parameter.

2. The method as recited in claim 1 in which said method further comprises: continually restarting said analog-to-digital converter.

3. The method as recited in claim 1 in which said electronic comparing is accomplished by:
   a. disposing a parameter-dependent resistive element within said fluid;
   b. converting the output of said element to a voltage, thereby forming a parameter-dependent voltage;
   c. generating a reference voltage corresponding to said reference parameter; and
   d. algebraically adding said reference voltage into said parameter-dependent voltage.

4. The method as recited in claim 3 in which said converting step comprises: passing an electric current of constant magnitude through said resistive element.

5. The method as recited in claim 1 in which said dividing step comprises: feeding said pulse train into a decade divider having at least two outputs.

6. The method as recited in claim 1 in which said applying step (f) comprises:
   a. differentiating the stage-by-stage output of said binary counter;
   b. inverting said output;
   c. inverting the stage-by-stage output of said converter; and
   d. algebraically adding inverted output to said inverted binary output.

7. The method as recited in claim 1 in which said step (a) is preceded by the step of: multiplying said pulse train.

8. A system for (1) metering the volumetric flow of a fluid wherein the flow is represented by a pulse train having a frequency corresponding to the flow rate, and (2) normalizing said frequency to a predetermined reference parameter in order to compensate for gravimetric change in said fluid, comprising:
   a. means for dividing said pulse train into two pulse subtrains;
   b. an N stage binary divider having as its input the output of one of said subtrains;
   c. means for electronically comparing the corresponding parameter of said fluid with said predetermined reference parameter;
   d. means for generating an analog voltage that is proportional to the algebraic difference between said parameters;
   e. an N stage analog-to-digital converter having said analog voltage as its input;
   f. means for applying the stage-by-stage output of said converter to each of the corresponding output stages of said binary divider;
   g. means for permitting a portion of the pulses of the output of said binary divider to pass to the other of said two pulse subtrains, such that the total of (i) the passed pulses and (ii) the pulses comprising said other subtrain, equals 100% of the number of pulses in the initial pulse train, said 100% occurring when said algebraic difference equals zero; and
   h. means for allowing additional pulses of said divider to be either passed or inhibited in a quantity directly proportional to the relative respective positive or negative polarity of said algebraic difference between said parameters,
   thereby obtaining a total pulse output having a frequency that is gravimetrically compensated to the predetermined reference parameter.

9. The system as recited in claim 8 in which said system further comprises means for continually restarting said analog-to-digital converter.

10. The system as recited in claim 8 in which said means for electronically comparing comprises:

a. a parameter-dependent resistive element disposed in said fluid;
b. means for converting the output of said element into a voltage in order to generate a parameter-dependent voltage;
c. means for generating a reference voltage corresponding in magnitude to said reference parameter; and
d. means for algebraically adding said reference voltage to said parameter-dependent voltage.

11. The system as recited in claim 8 in which said means for dividing comprises a decade divider having at least two outputs.

12. The system as recited in claim 8 in which said applying means comprises:
a. means for differentiating the stage-by-stage output of said binary divider; and
b. means for gating said differentiated outputs with the stage-by-stage outputs of said converter.

13. The system as recited in claim 12 in which said gating means comprises:
a. means for inverting said differentiated output;
b. means for inverting the stage-by-stage output of such converter; and
c. means for algebraically adding each of said inverted converter outputs to each corresponding inverted output of said binary divider.

* * * * *